(12) United States Patent
Michalscheck (10) Patent No.: US 8,751,504 B2
(45) Date of Patent: Jun. 10, 2014

(54) PROVIDING PROCEDURES

(71) Applicant: ESC Services, Inc., Franklin, WI (US)

(72) Inventor: Jimi Michalscheck, Oak Creek, WI (US)

(73) Assignee: ESC Apps, LLC, Racine, WI (US)

(*) Notice: Subject to any disclaimer, the term of this patent is extended or adjusted under 35 U.S.C. 154(b) by 3 days.

(21) Appl. No.: 13/653,187

(22) Filed: Oct. 16, 2012

(65) Prior Publication Data

US 2014/0108334 A1  Apr. 17, 2014

(51) Int. Cl.
*G06F 17/30* (2006.01)
*H04W 64/00* (2009.01)

(52) U.S. Cl.
CPC .................... *H04W 64/00* (2013.01)
USPC ............... 707/740; 707/E17.046; 705/14.26; 705/14.38; 235/375

(58) Field of Classification Search
CPC ... H04W 64/00; H04W 12/06; H04W 64/003; H04L 9/28; G06K 7/1456; G06Q 30/0238; G06Q 50/22; G06Q 50/24; G06Q 10/06316; G06Q 30/0261; G06F 21/6245; G06F 21/0245
USPC ............ 707/740, E17.046; 705/14.26, 14.38, 705/14.58, 14.67, 14.66; 235/375
See application file for complete search history.

(56) References Cited

U.S. PATENT DOCUMENTS

| | | | | |
|---|---|---|---|---|
| 8,331,955 B2* | 12/2012 | Bull et al. | | 455/456.1 |
| 8,533,075 B1* | 9/2013 | Sayers et al. | | 705/28 |
| 8,550,365 B1* | 10/2013 | Minvielle | | 235/492 |
| 2004/0232219 A1* | 11/2004 | Fowler | | 235/380 |
| 2005/0061890 A1* | 3/2005 | Hinckley | | 235/494 |
| 2007/0136814 A1* | 6/2007 | Lee et al. | | 726/25 |
| 2007/0260607 A1* | 11/2007 | Hajdukiewicz et al. | | 707/10 |
| 2009/0125128 A1* | 5/2009 | Eldridge et al. | | 700/86 |
| 2010/0022233 A1* | 1/2010 | Jung et al. | | 455/419 |
| 2010/0138566 A1* | 6/2010 | Knight | | 710/18 |
| 2011/0184776 A1* | 7/2011 | Spradling et al. | | 705/7.28 |
| 2011/0208657 A1* | 8/2011 | Rao | | 705/67 |
| 2011/0258160 A1* | 10/2011 | Lee et al. | | 707/626 |
| 2011/0276886 A1* | 11/2011 | Hall et al. | | 715/734 |
| 2012/0014488 A1* | 1/2012 | Liu et al. | | 375/359 |
| 2012/0165037 A1* | 6/2012 | Bull et al. | | 455/456.1 |
| 2012/0259655 A1* | 10/2012 | Madreperla | | 705/2 |
| 2012/0329553 A1* | 12/2012 | Gagner et al. | | 463/29 |
| 2013/0111555 A1* | 5/2013 | Leneel | | 726/4 |
| 2013/0334300 A1* | 12/2013 | Evans | | 235/375 |

OTHER PUBLICATIONS

P Marius—Informatica Economica, 2010—revistaie.ase.ro—"Audit Process during Projects for Development of New Mobile IT Application" pp. 34-46, vol. 14, Mar. 2010.*
"Intrusion Detection: Introduction to Intrusion Detection and Security Information Management"—Hervé Debar, Jouni Viinikka—Foundations of Security Analysis and Design III—Lecture Notes in Computer Science vol. 3655, 2005, pp. 207-236.*

* cited by examiner

Primary Examiner — Anh Ly
(74) Attorney, Agent, or Firm — Kunzler Law Group, PC (57) ABSTRACT

For providing procedures, a synchronize module stores a plurality of procedures in a procedure database. Each procedure is indexed to a reference code. The synchronize module synchronizes the plurality of procedures to a mobile device. A retrieval module receives a first reference code at the mobile device and retrieves a first procedure indexed to the first reference code.

19 Claims, 8 Drawing Sheets

| Auditor Data 232 | Attestation 240 |
|---|---|
| Audit Time 234 | Audit Status 242 |
| Audit Result 236 | Reference Code 205 |
| User ID 238 | Machine ID 225 |

| Reference Code 205a |
|---|
| Reference Code 205b |
| Reference Code 205c |

| Machine ID 225a |
|---|
| Machine ID 225b |
| Machine ID 225c |

FIG. 12B ically challenging.
PROVIDING PROCEDURES

FIELD

The subject matter disclosed herein relates to procedures and more particularly relates to providing procedures.

BACKGROUND

Description of the Related Art

Procedures are written for machinery to allow the machinery to be operated safely and without damage. Unfortunately, managing procedures for a number of machines can be logistically challenging.

BRIEF SUMMARY

A method for providing procedures is disclosed. A computer readable storage medium stores program code executable by a processor. The program code includes a synchronize module and a retrieval module. The synchronize module stores a plurality of procedures in a procedure database. Each procedure is indexed to a reference code. The synchronize module synchronizes the plurality of procedures to a mobile device. The retrieval module receives a first reference code at the mobile device and retrieves a first procedure indexed to the first reference code. An apparatus and computer program product also perform the functions of the method.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

Figure 1:
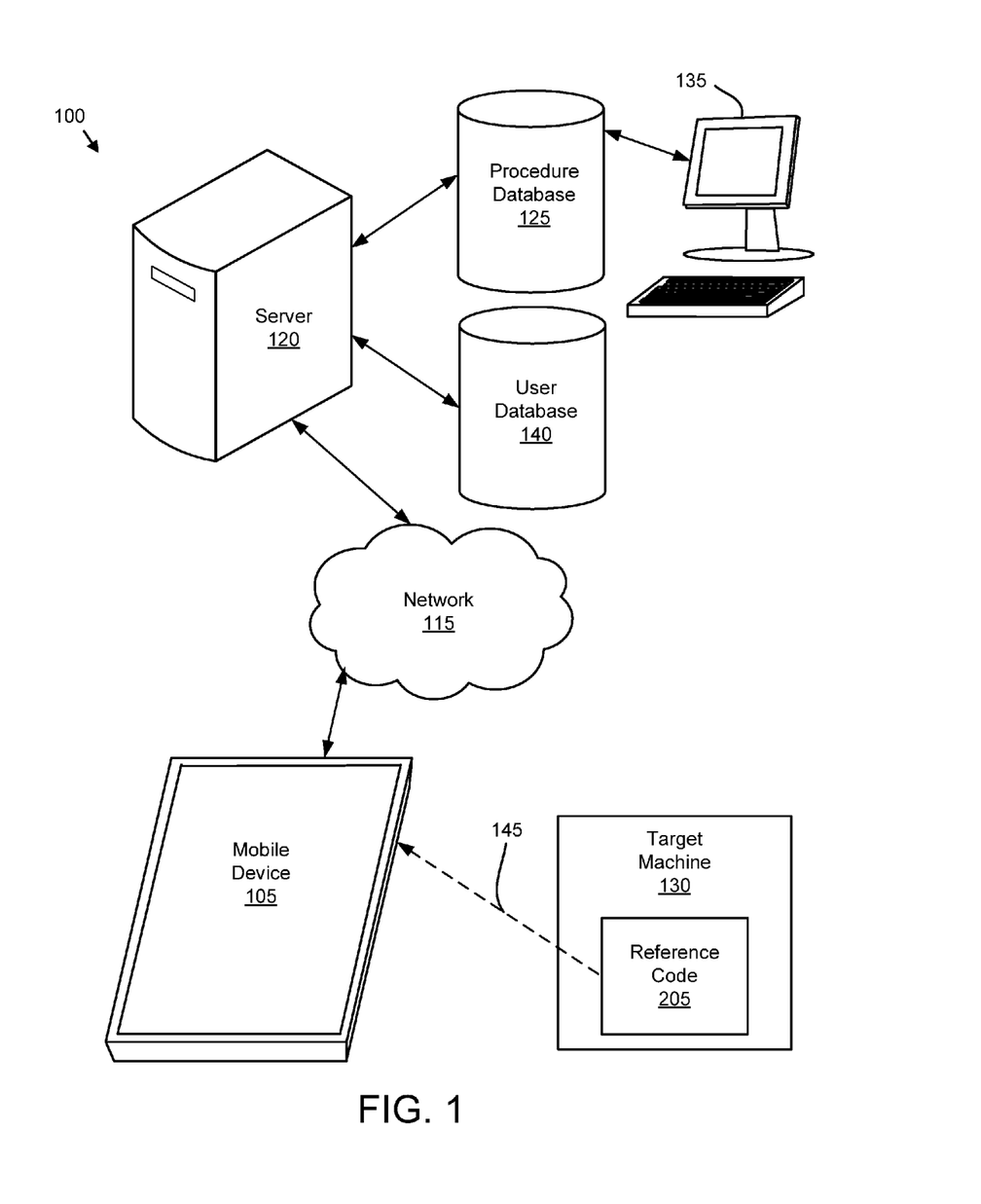
FIG. 1 is a schematic block diagram illustrating one embodiment of a system for providing procedures.

FIG. 1 is a schematic block diagram illustrating one embodiment of a system 100 for providing procedures. The system 100 provides a procedure for a target machine 130. The system 100 includes a server 120, a procedure database 125, a user database 140, a workstation 135, a network 115, a mobile device 105, a target machine 130, and a reference code 205.

The target machine 130 may be electrical equipment, chemical equipment, manufacturing equipment, climate control equipment, process control equipment, safety equipment, or the like. To safely operate the target machine 130, a user should follow a procedure. The procedure may be a lock out/tag out procedure, a startup procedure, a service procedure, an adjustment procedure, or the like.

Safe and efficient operation of the target machine 130 is increased when the proper procedure is available for the target machine 130. Unfortunately, through oversight or mistake, the latest procedure may not be available at the location of the target machine 130. In addition, a paper document containing a procedure may be inadvertently removed from the location of the target machine 130 or may be rendered illegible.

In order to enhance safety and comply with safety regulations, the availability and proper use of a procedure for the target machine 130 may be periodically audited. Such an audit may be difficult to track, manage, and report on.

The embodiments described herein provide procedures for target machines 130 as will be described hereafter. As a result, the latest and most appropriate procedure is available at the target machine 130. In addition, the embodiments may audit the procedures and audit the users of the procedures, and provide the audit information to an administrator.

The reference code 205 is affixed to the target machine 130. The reference code 205 may be disposed on a machine label as will be described hereafter. The machine label may be attached to the target machine 130. In one embodiment, the reference code 205 is printed on an adhesive label that is affixed to the target machine 130. The reference code 205 may be encoded as a Quick Reference (QR) code. In addition, the reference code 205 may also be displayed in a human readable form.

In an alternate embodiment, the reference code 205 is encoded as a barcode. The reference code 205 may also be encoded as an identification code broadcast via a Radio Frequency Identifier (RFID).

The reference code 205 refers to a procedure stored in the procedure database 125. In one embodiment, the reference code 205 is used as an index to the procedure. The procedure may be created, edited, updated, and/or deleted from the workstation 135. The procedure database 125 may also store tutorials. A tutorial may be associated with one or more procedures.

The server 120 may communicate the procedure through the network 115 to the mobile device 105. The network 115 maybe the Internet, a cellular telephone network, a wide area network, a local area network, or combinations thereof.

The server 120 may synchronize all procedures in the procedure database 125 to the mobile device 105 so that the mobile device 105 stores a copy of all the procedures in the procedure database 125. Thus all the procedures may be available on the mobile device. In addition, the server 120 may synchronize tutorials from the procedure database 125 to the mobile device 105.

In one embodiment, the server 120 maintains a site list of target machines 130 at a specified site. The site list may include a reference code 205 for each target machine 130 at the specified site. Alternatively, the site list may include a machine identifier for each target machine 130. The server 120 may synchronize only procedures with reference codes 205 that match at least one reference code 205 of the site list to the mobile device 105. In one embodiment, the procedures are organized as a database, a data structure, or combinations thereof on the mobile device 105.

The mobile device 205 may be a tablet computer, a mobile phone, a notebook computer, a personal digital assistant, or the like. The mobile device 105 may receive the reference code 205. In one embodiment, the mobile device 105 optically scans a QR code encoding the reference code 205. Alternatively, the mobile device 105 may optically scan a barcode encoding the reference code 205. In a certain embodiment, the mobile device 105 wirelessly queries an RFID and receives the reference code 205 encoded in a wireless response.

The mobile device 105 may use the reference code 205 as an index to retrieve the procedure indexed to the reference code 205 from the mobile device 105. The mobile device 105 may display the procedure, allowing the user to perform the procedure on the target machine 130.

If the procedure associated with the reference code 205 is not stored on the mobile device 105, the mobile device may use the reference code 205 to request the procedure from the server 120 through the network 115. The server 120 may synchronize the procedure from the procedure database 125 through the network 115 to the mobile device 105 so that the procedure may be displayed by the mobile device 105.

By synchronizing the procedures to the mobile device 105, a user may access the correct procedure for the target machine 130 on the mobile device 105 even if the paper document with the procedure has been removed from the target machine 130 or if an incorrect procedure is placed with the target machine 130.

Figure 2:
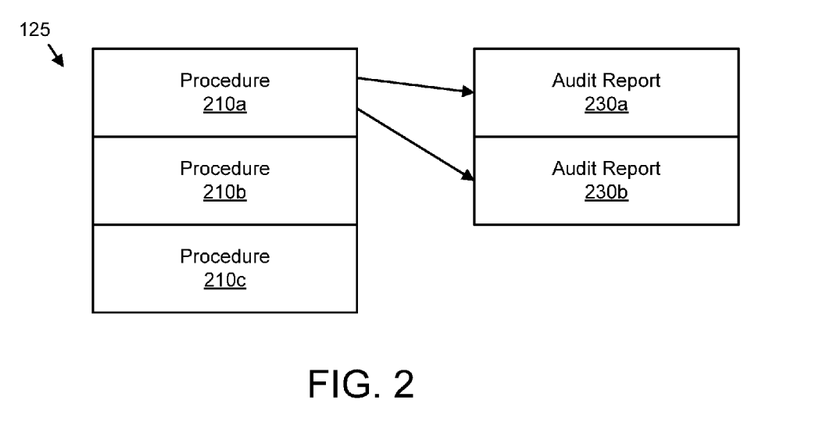
FIG. 2 is a schematic block diagram illustrating one embodiment of a procedure database.

FIG. 2 is a schematic block diagram illustrating one embodiment of a procedure database 125. The procedure database 125 is the procedure database 125 of FIG. 1. The procedure database 125 includes a plurality of procedures 210 as will be described hereafter. The procedure database 125 may include a plurality of tables, with a plurality of entries in each table. In addition, each procedure 210 may be associated with one or more audit reports 230. In one embodiment, the audit reports 230 are embodied in one or more separate tables of the procedure database 125, the user database 140, and/or a separate audit database (not shown).

Figure 3:
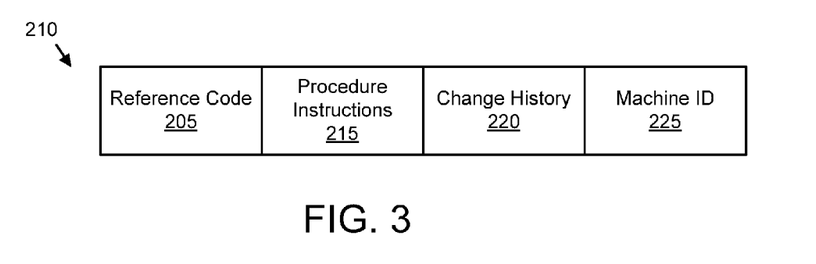
FIG. 3 is a schematic block diagram illustrating one embodiment of a procedure.

FIG. 3 is a schematic block diagram illustrating one embodiment of the procedure 210. The procedure 210 is the procedure 210 of FIG. 2. The procedure 210 may include a plurality of segments. The segments may be stored in one or more tables. The segments may include the reference codes 205, procedure instructions 215, a change history 220, and a machine identifier 225. The reference code 205 may index the procedure 210. Alternatively, the reference code 205 may identify the target machine 130.

The procedure instructions 215 may include instructions in text, hypertext, audio, video, and combinations thereof. The procedure instructions 215 may be displayed and/or transmitted to allow the user to perform an operation on the target machine 130.

The change history 220 may record changes to the procedure instructions 215. In one embodiment, changes are recorded to the change history 220 automatically. The machine identifier 225 may include a unique identifier such as serial numbers for one or more target machines 130. The machine identifier 225 may also be used index the procedure 210 in the procedure database 125.

Figure 4:
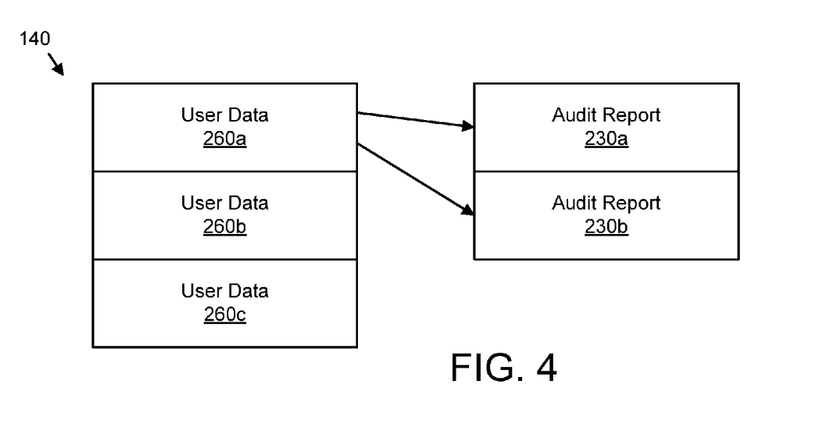
FIG. 4 is a schematic block diagram illustrating one embodiment of a user database.

FIG. 4 is a schematic block diagram illustrating one embodiment of a user database 140. The user database 140 is the user database 140 of FIG. 1. The user database 140 maybe organized as a plurality of tables. The user database 140 includes user data 260. The user data 260 may include a user name, a user identifier such as employee number, a user image, a biometric identifier, a signature, and the like. In one embodiment, one or more audit reports 230 are associated with the user data 260.

Figure 5:
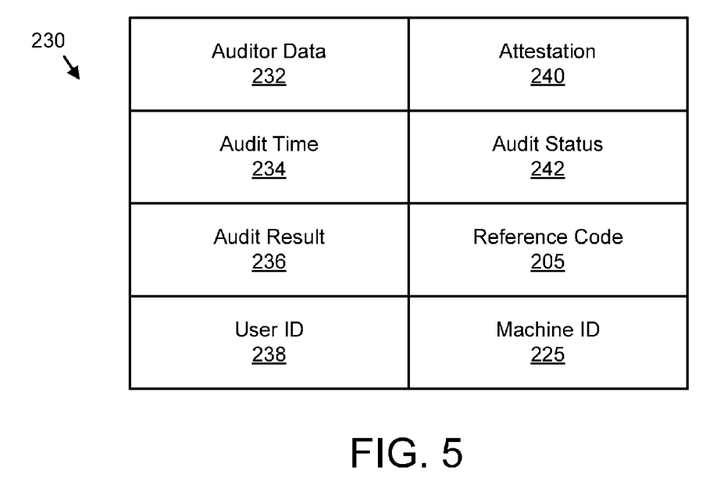
FIG. 5 is a schematic block diagram illustrating one embodiment of an audit report.

FIG. 5 is a schematic block diagram illustrating one embodiment of an audit report 230. The audit report 230 is the audit report 230 of FIGS. 2 and 4. The audit report 230 may be embodied in one or more tables, a data structure, and the like. The audit report 230 includes auditor data 232, an audit time 234, audit results 236, the user identifier 238, an attestation 240, an audit status 242, a reference code 205, and a machine identifier 225.

The auditor data 232 may identify an auditor performing the audit. In one embodiment, the auditor is identified as the individual logging into the mobile device 105 to perform the audit. The auditor data 232 may also include user data 260.

The audit time 234 may be a timestamp indicating when the audit was completed. The audit result 236 may describe the results of the audit. The audit results 236 may include a data structure encoding results of the audit, hypertext encoding results of the audit, a written description, a verbal description, and a video description, and combinations thereof. The audit status 242 may summarize the audit such as with a pass/fail indication.

In one embodiment, the user identifier 238 identifies the user performing operations on the target machine 130. The user identifier 238 may refer to the user data 260. The reference code 205 is the reference code of the procedure 210 on the target machine 130. The machine identifier 225 is the machine identifier 225 of the target machine 130. In one embodiment, the auditor may login to the mobile device 105 and select an audit option. An identifier for the auditor may be stored with the auditor data 232.

The mobile device 105 may scan the reference code 205 to identify the procedure 210. The module device 105 may further scan an employee badge of the user to capture the user identifier 238. The mobile device 105 may also scan the machine identifier 225 of the target machine 130.

The auditor may observe the user performing the procedure 210 associated with the reference code 205. The results of the audit are stored in the audit result 236.

Figure 6A:
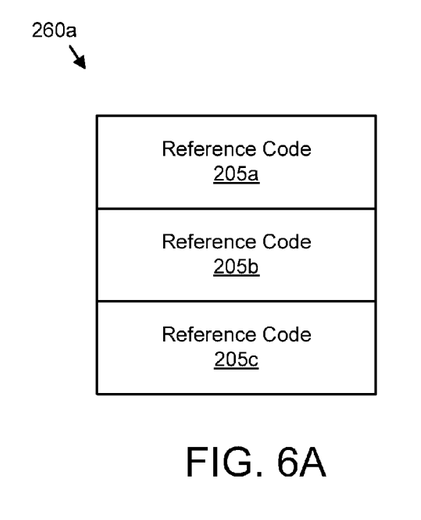
FIGS. 6A-B are a schematic block diagrams illustrating embodiments of sites lists.
Figure 6B:
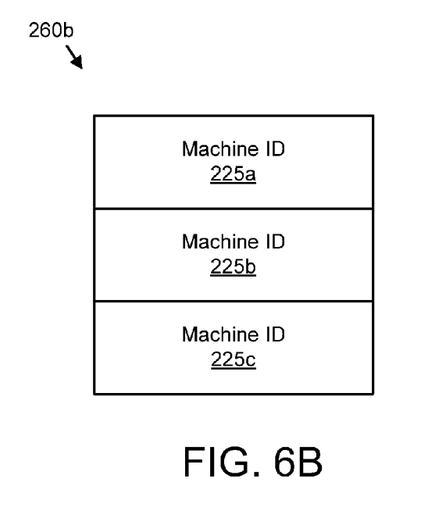

FIGS. 6A-B are a schematic block diagrams illustrating embodiments of sites lists 260. In one embodiment, a first site list 260a lists the reference codes 205 of target machines 130 at the specified site. Alternatively, a second site list 260 B lists the machine identifiers 225 of target machines 130 at the specified site. The site list 260 may be used to determine which procedures 210 are to be synchronized from the procedure database 125 to the mobile device 105.

Figure 7:
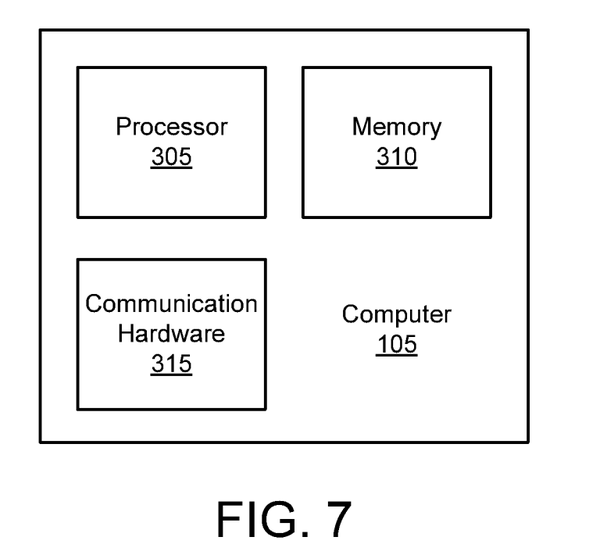
FIG. 7 is a schematic block diagram illustrating one embodiment of a computer.

FIG. 7 is a schematic block diagram illustrating one embodiment of the computer 300. The computer 300 may be the server 120 of FIG. 1. Alternatively, the computer 300 may be the mobile device 105 and/or the workstation 135 of FIG. 1. The computer 300 includes a processor 305, a memory 310, and communication hardware 315. The memory 310 may be a computer readable storage medium such as a semiconductor storage device, a hard disk drive, an optical drive, a holographic storage device, a micromechanical storage device, or combinations thereof. The memory 310 may store program code. The processor 305 may execute the program code. The communication hardware 315 may communicate with other devices.

Figure 8:
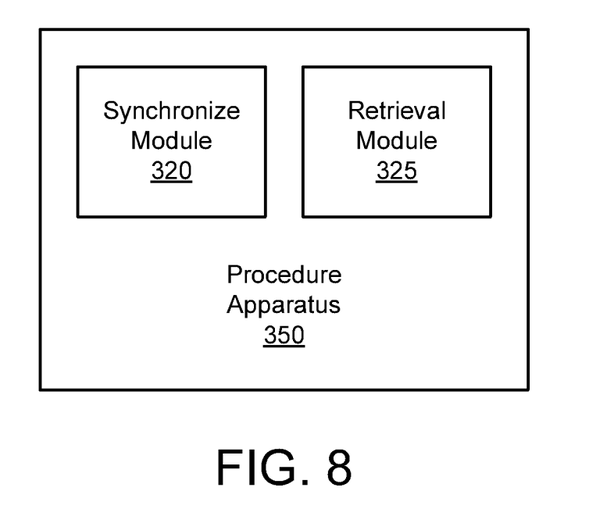
FIG. 8 is a schematic block diagram illustrating one embodiment of a procedure apparatus.

FIG. 8 is a schematic block diagram illustrating one embodiment of the procedure apparatus 350. The apparatus 350 may be embodied in the computer 300. In one embodiment, the apparatus 350 is embodied in the server 120, the mobile device 105, or combinations thereof. The apparatus 350 includes a synchronize module 320 and a retrieval module 325. The synchronize module 320 and the retrieval module 325 may be embodied in a computer readable storage medium such as the memory 310 storing program code that is executed by the processor 305.

The synchronize module 320 stores a plurality of procedures 210 in the procedure database 125. In addition, the synchronize module 320 synchronizes the plurality of procedures 210 to the mobile device 105.

The retrieval module 325 may receive the reference code 205 at the mobile device 105. In addition, the retrieval module 325 may retrieve the procedure 210 indexed to the reference code 205. Additional functions of the apparatus 350 are described hereafter.

Figure 9:
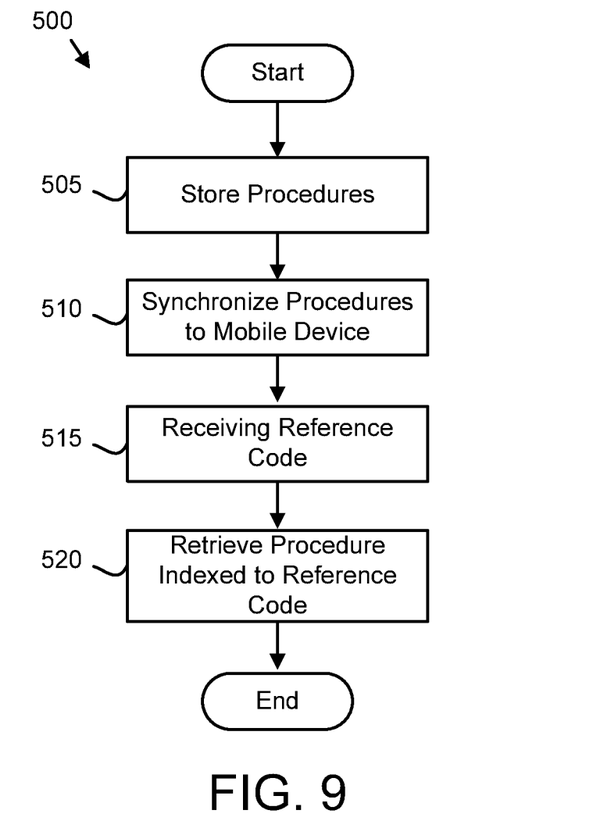
FIG. 9 is a schematic flow chart diagram illustrating one embodiment of a procedure provision method.

FIG. 9 is a schematic flow chart diagram illustrating one embodiment of a procedure provision method 500. The method 500 may perform the functions of the system 100 and apparatus 350. In one embodiment, the method 500 is performed by a computer readable storage medium such as the memory 310 storing program code. The program code may be executed by the processor 305 to perform the functions of the method 500.

The method 500 starts, and in one embodiment the synchronization module 320 stores 505 a plurality of procedures 210 in a procedure database 125. Each procedure 210 may be indexed with a reference code 205. Alternatively, each procedure 210 may be indexed with a machine identifier 225.

The synchronization module 320 may synchronize 510 procedures 210 from the procedure database 125 to the mobile device 105. In one embodiment, all procedures 210 are synchronized from the procedure database 125 to the mobile device 105. In an alternative embodiment, only procedures 210 corresponding to reference codes 205 and/or machine identifiers 225 on a site list 260 are synchronized 510 to the mobile device 105. In one embodiment, the procedures 210 are synchronized when the mobile device 105 is in communication with the network 115.

The retrieval module 325 receives 515 the reference code 205. In one embodiment, the retrieval module 325 embodied in the mobile device 105 scans a QR code reference code 205 affixed to the target machine 130. Alternatively, the retrieval module 325 may receive 515 the reference code 205 by scanning a barcode, receiving the reference code 205 wirelessly, or by scanning human readable text. The retrieval module 325 may convert the scanned QR code, the scanned barcode, the human readable text, and/or the received reference code 205 into a digital string.

The retrieval module 325 may retrieve 520 the procedure 210 corresponding to the retrieval code 205 that is stored on the mobile device 105 and the method 500 ends. In one embodiment, the retrieval module 325 uses the retrieval code 205 is an index to access the procedure 210. In one embodiment, if the procedure 210 corresponding to the reference code 205 is not stored on a mobile device 105, the retrieval module 325 may use the reference code 205 to request the procedure 210 from the server 120 over the network 115.

The procedure 210 may be displayed on the mobile device 105. Alternatively, the procedure 210 may be communicated to a second device. In one embodiment, actions taken by the user are recorded to the procedure 210. In a certain embodiment, the procedure 210 includes a contact link that connects the user to an expert or service personnel.

Figure 10:
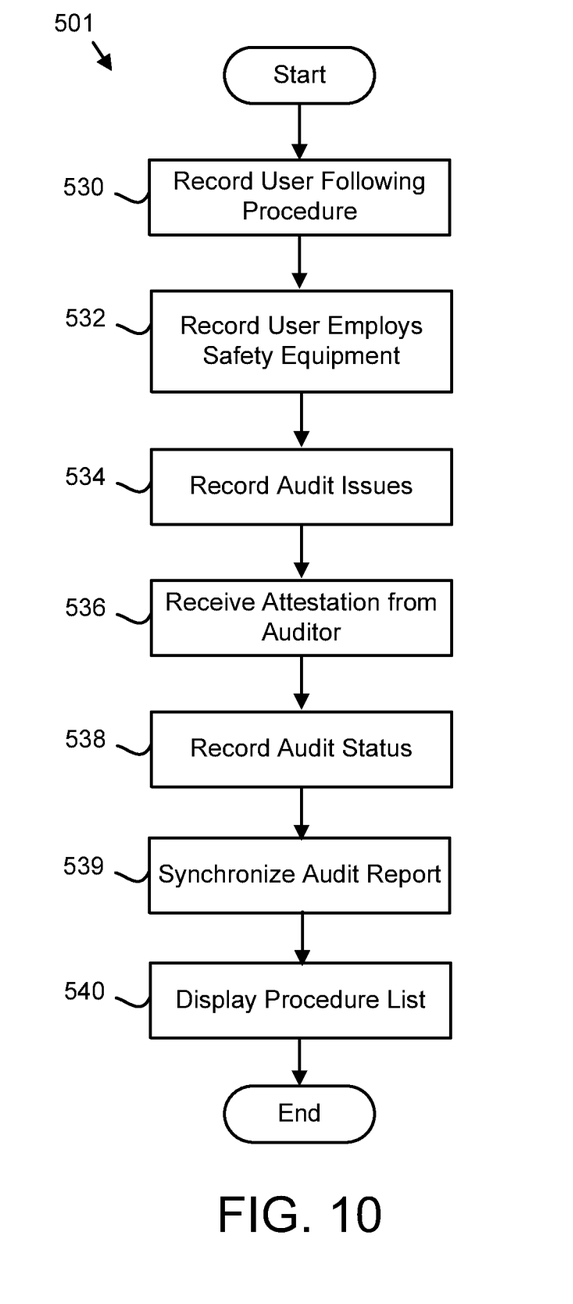
FIG. 10 is a schematic flowchart diagram illustrating one embodiment of an audit method.

FIG. 10 is a schematic flowchart diagram illustrating one embodiment of an audit method 501. The method 501 may perform the functions of the system 100 and apparatus 350. In one embodiment, the method 501 is performed by a computer readable storage medium such as the memory 310 storing program code. The program code may be executed by the processor 305 to perform the functions of the method 501.

The method 501 starts, and in one embodiment the retrieval module 325 records 530 a user following and/or performing a procedure 210. The retrieval module 325 may record 530 the following of the procedure 210 to the audit result 236 of an audit report 230. The retrieval module 325 may further record 530 the individual performing the audit to the auditor data 232.

In one embodiment, the retrieval module 325 records 532 if the user employs safety equipment specified by the procedure 210 to the audit result 236. For example, the procedure 210 may specify the use of the tool. The retrieval module 325 may record 532 if the specified tool is used as part of the procedure 210.

The retrieval module 325 may record 534 audit issues for the procedure 210 to the audit results 236. The audit issues may include that the target machine 130 is incorrectly marked, that the target machine 130 lacks the required safety equipment, that the target machine 130 lacks a physical copy of the procedure 210, that the steps of the procedure 210 were incorrectly followed, that the user was improperly trained, and the like.

In one embodiment, the retrieval module 325 records 536 an attestation from the auditor. The attestation may be an electronic signature, a biometric identifier, the signature image, or combinations thereof. The retrieval module 325 may further record 538 an audit status 242 that may indicate if the procedure 210, the user, or combinations thereof passed the audit.

The synchronize module 320 may synchronize 539 the audit report 230 to the procedure database 125. The audit report 230 may be associated with the procedure 210. In addition, the synchronize module 320 may synchronize 539 the audit report 230 to the user database 140 and associate the audit report 230 with the user data 260 of the user.

In one embodiment, the retrieval module 325 displays 540 a procedure list of the plurality of procedures 210. The procedure list may be displayed 540 on the workstation 135 and/or on the mobile device 105. The procedure list may include a procedure status for each procedure 210. The procedure status may indicate that a reference code 205 is unassigned that an audit is passed, failed, and/or that the audit is complete.

In one embodiment, the retrieval module 325 displays 540 a summary the audit status for all procedures 210. Alternatively, the retrieval module 325 displays 540 a summary of the audit status for all users. The summary of the audit status may be used to show compliance with one or more regulations.

Figure 11:
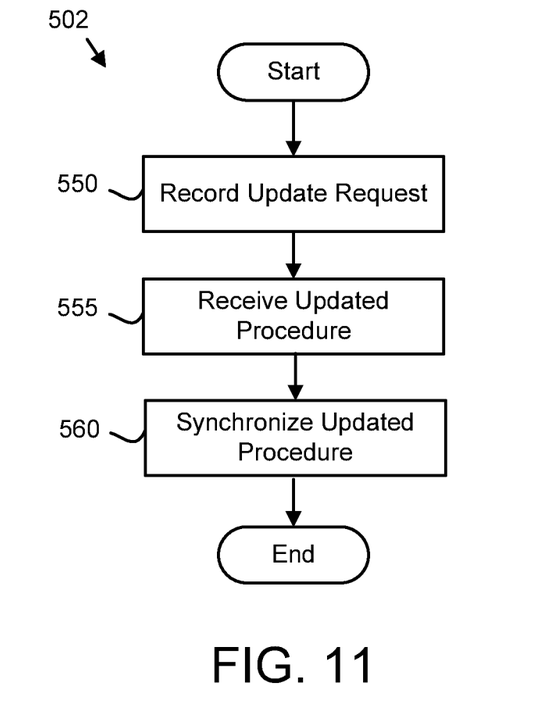
FIG. 11 is a schematic flowchart diagram illustrating one embodiment of an update method.

FIG. 11 is a schematic flowchart diagram illustrating one embodiment of an update method 502. The method 502 may perform the functions of the system 100 and apparatus 350. In one embodiment, the method 502 is performed by a computer readable storage medium such as the memory 310 storing program code. The program code may be executed by the processor 305 to perform the functions of the method 502.

The method 502 starts, and in one embodiment the retrieval module 325 records 550 an update request. A user may initiate the update request if an error or other problem is found in the procedure 210. Alternatively, the update request may be recorded 550 in response to an audit issue. The update request may be recorded 550 to the procedure database 125 and prompt an administrator to edit or otherwise correct the procedure using the workstation 135. The updated procedure 210 is received 555 in the procedure database 125. The synchronize module 320 may synchronize 560 the updated procedure 210 to the mobile device 105. In one embodiment, the updated procedure 210 includes a time stamp. The time stamp of the updated procedure 210 may be compared to a time stamp of the procedure corresponding to the same reference code 205 on the mobile device 105 and the updated procedure 210 synchronized if the time stamp of the updated procedure 210 is later.

Figure 12A:
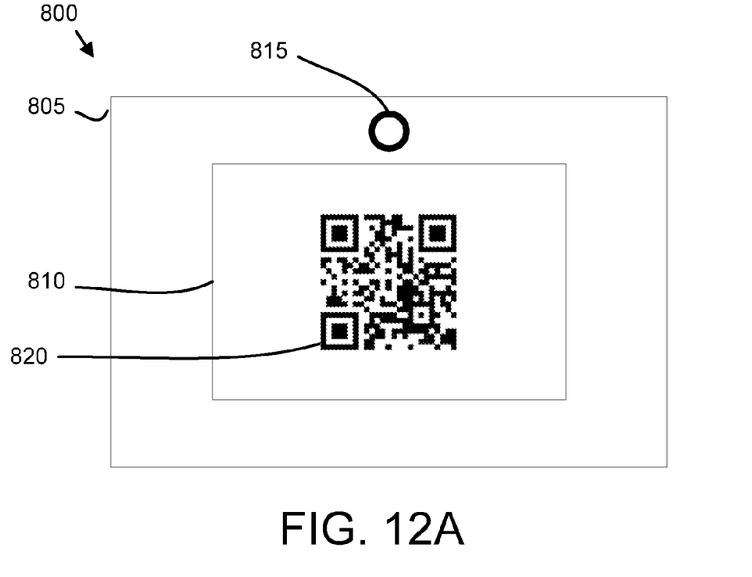
FIGS. 12A-B our front view drawings illustrating one embodiment of a machine label.
Figure 12B:
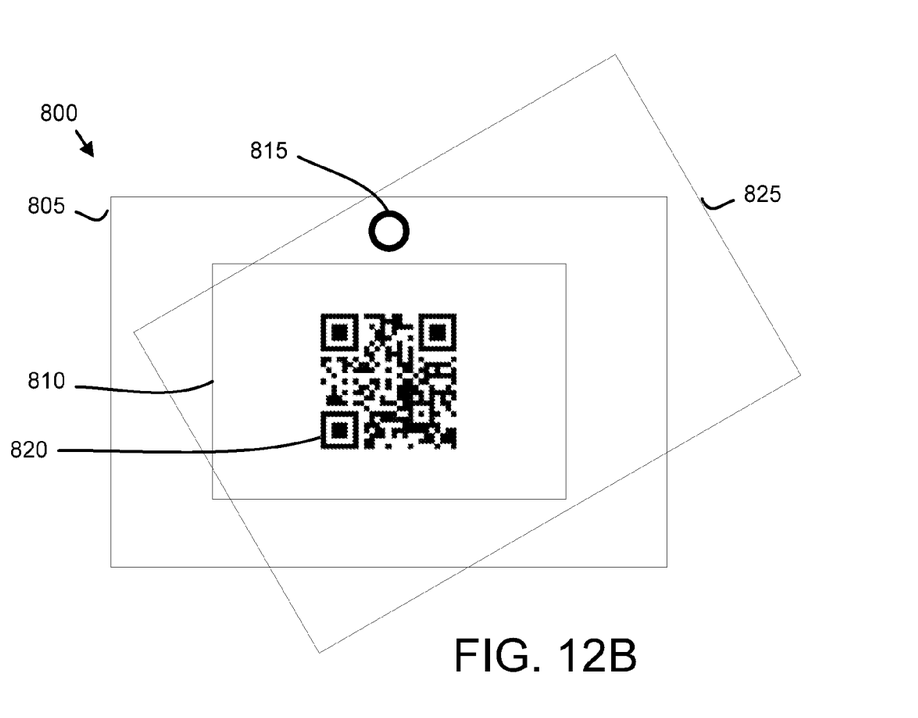

FIGS. 12A-B are front view drawings illustrating one embodiment of a machine label 800. The machine label 800 may be affixed to the target machine 130 of FIG. 1. In the depicted embodiment, the machine label 800 includes a back 805. A pivot 815 is disposed on the back 805 and connected to a transparent cover 825. The transparent cover 825 may rotate about the pivot 815. The transparent cover 825 may be rotated to expose a face of the back 805. A label 810 is disposed on the face of the back 805. In one embodiment, the label 810 includes a QR code 820. Alternatively, the label 810 may include a barcode, human readable text, an RFID, or combinations thereof. FIG. 12A depicts the transparent cover 825 covering the back 805. The mobile device 105 may scan the QR code 820 through the transparent cover 825. The transparent cover protects the QR code 820 from damage. FIG. 12B depicts the transparent cover 825 rotated about the pivot 815 to give access to the label 810.

The embodiments provide procedures 210 at the mobile device 105. As a result, a latest, most appropriate procedure 210 may always be available for use in locking out, tagging out, operating, activating, modifying, or servicing the target machine 130. The embodiments may further audit the procedures 210 and the users of the procedures, and provide a status of audit results.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for providing procedures comprising:
storing, by use of a processor, a plurality of procedures in a procedure database, wherein each procedure is indexed to a reference code and comprises two or more of a lockout/tag out procedure, a startup procedure, a service procedure, and an adjustment procedure for a target machine, wherein each procedure comprises the reference code, procedure instructions, a change history and a machine identifier stored as segments in one or more tables;
synchronizing the plurality of procedures to a mobile device;
receiving a first reference code at the mobile device, wherein the first reference code is affixed to the target machine and is encoded as one of a Quick Response (QR) code and a barcode;
retrieving a first procedure indexed to the first reference code;
recording if a user follows the first procedure to an audit report; and
recording if the user employs safety equipment specified by the first procedure to the audit report.

2. The method of claim 1, further comprising:
recording audit issues for the first procedure to the audit report;
recording an attestation from an auditor to the audit report;
recording an audit result to the audit report; and
synchronizing the audit report to a user database with the audit report linked to the user and to the procedure database with the audit report linked to the first procedure.

3. The method of claim 2, the audit report comprising the auditor, the user, an audit time, the audit status, and the reference code.

4. The method of claim 2, further comprising displaying the audit status for the plurality of processes and audit status for the user.

5. The method of claim 1, wherein each procedure is a lock out/tag out procedure for a machine.

6. The method of claim 1, wherein the first reference code is further encoded as an identification code of a Radio Frequency Identifier (RFID).

7. The method of claim 1, wherein the method further comprising:
recording an update request for the first procedure; and
receiving an update to the first procedure in response to the update request.

8. The method of claim 7, wherein the updated first procedure is synchronized to the mobile device in response to receiving the update to the first procedure.

9. The method of claim 1, wherein each procedure further comprises a machine identifier.

10. The method of claim 1, further comprising maintaining a site list of reference codes for a specified site and synchronizing only procedures with reference codes that match at least one reference code of the site list.

11. The method of claim 1, further comprising displaying a procedure list of the plurality of procedures and a procedure status for each procedure selected from reference code unassigned, audit incomplete, and audit complete.

12. The method of claim 1, further comprising synchronizing a plurality of tutorials to the mobile device.

13. The method of claim 1, wherein the target machine is one of electrical equipment, chemical equipment, manufacturing equipment, climate control equipment, process control equipment, and safety equipment.

14. An apparatus comprising:
a computer readable storage medium storing program code executable by a processor, the program code comprising:
a synchronize module storing a plurality of procedures in a procedure database, wherein each procedure is indexed to a reference code and comprises two or more of a lockout/tag out procedure, a startup procedure, a service procedure, and an adjustment procedure for a target machine, wherein each procedure comprises the reference code, procedure instructions, a change history and a machine identifier stored as segments in one or more tables, and synchronizing the plurality of procedures to a mobile device; and
a retrieval module receiving a first reference code at the mobile device, wherein the first reference code is affixed to the target machine and is encoded as one of a Quick Response (QR) code and a barcode, retrieving a first procedure indexed to the first reference code, recording if a user follows the first procedure to an audit report, and recording if the user employs safety equipment specified by the first procedure to the audit report.

15. The apparatus of claim 14, further comprising:
the retrieval module recording audit issues for the first procedure to the audit report, recording an attestation from an auditor to the audit report, recording an audit result to the audit report; and
the synchronize module synchronizing the audit report to a user database with the audit report linked to the user and to the procedure database with the audit report linked to the first procedure.

16. The apparatus of claim 14, wherein the target machine is one of electrical equipment, chemical equipment, manufacturing equipment, climate control equipment, process control equipment, and safety equipment.

17. A computer program product for providing procedures, the computer program product comprising a non-transitory computer readable storage medium having program code embodied therein, the program code readable/executable by a processor to:
store a plurality of procedures in a procedure database, wherein each procedure is indexed to a reference code and comprises two or more of a lockout/tag out procedure, a startup procedure, a service procedure, and an adjustment procedure for a target machine, wherein each procedure comprises the reference code, procedure instructions, a change history and a machine identifier stored as segments in one or more tables;
synchronize the plurality of procedures to a mobile device;
receive a first reference code at the mobile device, wherein the first reference code is affixed to the target machine and is encoded as one of a Quick Response (QR) code and a barcode;
retrieve a first procedure indexed to the first reference code;
recording if a user follows the first procedure to an audit report; and
recording if the user employs safety equipment specified by the first procedure to the audit report.

18. The computer program product of claim 17, the program code further:
recording an update request for the first procedure; and
receiving an update to the first procedure in response to the update request.

19. The computer program product of claim 17, wherein the target machine is one of electrical equipment, chemical equipment, manufacturing equipment, climate control equipment, process control equipment, and safety equipment.

* * * * *